US011760418B2

(12) United States Patent
Selvasekar et al.

(10) Patent No.: US 11,760,418 B2
(45) Date of Patent: Sep. 19, 2023

(54) ENERGY ABSORBER BETWEEN VEHICLE ROOF AND HEADLINER

(71) Applicant: Ford Global Technologies, LLC, Dearborn, MI (US)

(72) Inventors: Siddharthan Selvasekar, Livermore, CA (US); Otis Allen, Soquel, CA (US); Andres Almeida Senatore, San Jose, CA (US); Hector Hernandez, Lerma (MX); Christopher Robert Tilli, Brighton, MI (US); Michael Steven Medoro, Sunnyvale, CA (US); Robert Ralph Armitage, Howell, MI (US); Michael M. Azzouz, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/367,940

(22) Filed: Jul. 6, 2021

(65) Prior Publication Data

US 2023/0009520 A1    Jan. 12, 2023

(51) Int. Cl.
*B62D 21/15* (2006.01)
*B62D 29/04* (2006.01)
(Continued)

(52) U.S. Cl.
CPC ........ *B62D 21/152* (2013.01); *B60R 13/0212* (2013.01); *B62D 25/06* (2013.01); *B62D 29/043* (2013.01); *B60R 13/02* (2013.01); *B60R 13/0225* (2013.01); *B60R 13/08* (2013.01); *B60R 21/04* (2013.01); *B60R 2021/0253* (2013.01); *B60R 2021/0414* (2013.01); *B60R 2021/0421* (2013.01); *B60R 2021/0442* (2013.01)

(58) Field of Classification Search
CPC ..... B60R 13/02; B60R 13/0212; B60R 13/08; B60R 13/0225; B60R 21/02; B60R 21/04; B60R 2021/0266; B60R 2021/0253; B60R 2021/0442; B60R 2021/0414; B60R 2021/0421; Y10T 428/24; Y10T 428/24628; Y10T 428/24669; Y10T 428/24678
USPC ................ 296/187.01, 187.03, 187.05, 214; 280/751; 188/371, 377
See application file for complete search history.

(56) References Cited

U.S. PATENT DOCUMENTS 5,518,802 A * 5/1996 Colvin ...................... B32B 3/12
                                                         428/72
5,636,866 A * 6/1997 Suzuki .................... B60R 21/04
                                                       296/187.05

(Continued)

FOREIGN PATENT DOCUMENTS

DE          10134182 A1      1/2002
DE       102009017758 A1    10/2010

*Primary Examiner* — Dennis H Pedder
*Assistant Examiner* — Joyce Eileen Hill
(74) *Attorney, Agent, or Firm* — Frank A. MacKenzie; Bejin Bieneman PLC

(57) ABSTRACT

An assembly for a vehicle includes a vehicle roof and a headliner supported by the vehicle roof. The assembly includes an energy absorber between the headliner and the vehicle roof. The energy absorber includes a wall extending transversely to the headliner and the vehicle roof. The wall includes a lattice structure including a repeating pattern of strips and open cells.

11 Claims, 7 Drawing Sheets

(51) Int. Cl.
*B62D 25/06* (2006.01)
*B60R 13/02* (2006.01)
*B60R 13/08* (2006.01)
*B60R 21/04* (2006.01)
*B60R 21/02* (2006.01)

(56) References Cited

U.S. PATENT DOCUMENTS

| | | | |
|---|---|---|---|
| 6,199,942 B1* | 3/2001 | Carroll, III | B62D 21/15 |
| | | | 296/187.05 |
| 8,186,748 B2 | 5/2012 | Chickmenahalli et al. | |
| 9,815,232 B2 | 11/2017 | Nabeshima et al. | |
| 10,006,515 B2 | 6/2018 | Tamada | |
| 2005/0161982 A1 | 7/2005 | Cormier et al. | |
| 2005/0168015 A1* | 8/2005 | Davey | B60R 13/0225 |
| | | | 296/214 |
| 2005/0181178 A1* | 8/2005 | Murayama | B60R 21/04 |
| | | | 428/167 |
| 2012/0049569 A1* | 3/2012 | Chickmenahalli | B60R 21/04 |
| | | | 296/187.05 |
| 2016/0215843 A1 | 7/2016 | Tamada | |
| 2018/0257597 A1* | 9/2018 | Migaki | F16F 7/12 |
| 2018/0311925 A1* | 11/2018 | Tyan | B31D 3/0207 |
| 2020/0141132 A1 | 5/2020 | Cormier et al. | |
| 2020/0398902 A1 | 12/2020 | Yamagiwa et al. | |

* cited by examiner

US 11,760,418 B2

ENERGY ABSORBER BETWEEN VEHICLE ROOF AND HEADLINER

BACKGROUND

A vehicle may include energy absorbers between a headliner of the vehicle and a vehicle roof of the vehicle. The energy absorbers may absorb energy in the event of a crash event to the vehicle by deforming between the headliner and the vehicle roof. The energy absorbers may be localized.

DETAILED DESCRIPTION

Figure 1:
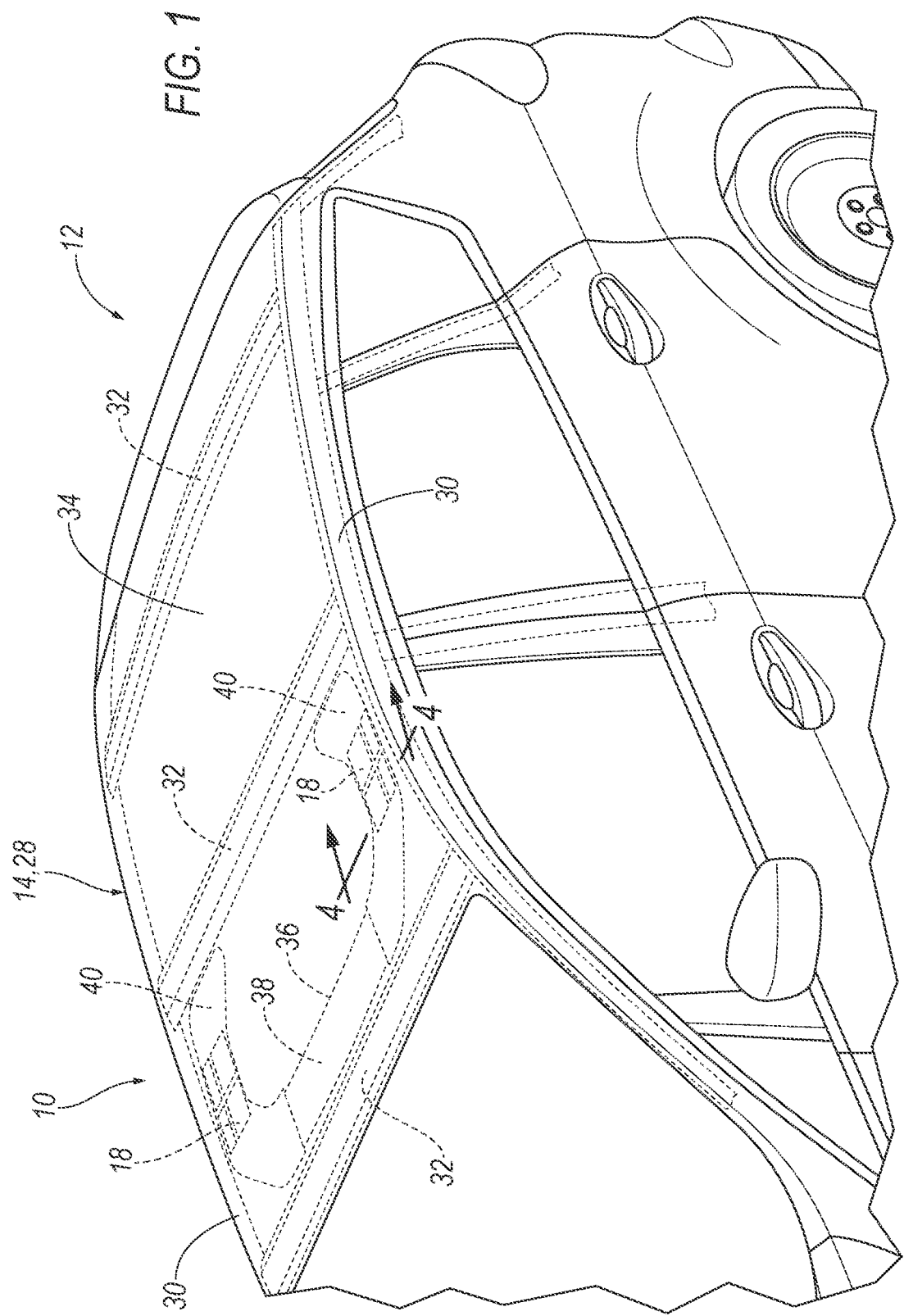
FIG. 1 is a perspective view of a vehicle having energy absorbers abutting a vehicle roof.

An assembly includes a vehicle roof and a headliner supported by the vehicle roof. The assembly includes an energy absorber between the headliner and the vehicle roof, the energy absorber having a wall extending transversely to the headliner and the vehicle roof. The wall has a lattice structure including a repeating pattern of strips and open cells.

The energy absorber may include additional walls extending transversely to each other and transversely to the headliner and the walls defining a cavity therebetween.

The open cells may extend through the wall from the cavity to an exterior of the energy absorber.

The energy absorber may be polypropylene.

At least one of the additional walls may include the lattice structure.

The energy absorber may include an end panel connected to the walls and extending across the cavity and a base distal to the end panel, the cavity being open at the base, the end panel abutting one of the vehicle roof and the headliner and the base being adhered to the other of the vehicle roof and the headliner.

The base may be shaped to match contours of the other of the vehicle roof and the headliner.

The end panel may be shaped to match contours of the one of the vehicle roof and the headliner.

The lattice structure may include a first portion and a second portion, the strips of the first portion being a material type different than the material type of the strips of the second portion.

The lattice structure may include a first portion and a second portion, the strips having a height at the first portion and a height at the second portion different from the height at the first portion.

The lattice structure may include a first portion and a second portion, the open cells having a volume at the first portion and a volume at the second portion different from the volume at the first portion.

The wall may include a vehicle-inboard end having a stiffness and a vehicle-outboard end having a stiffness, the stiffness at the vehicle-inboard end being greater than the stiffness at the vehicle-outboard end.

The strips may have a height at the vehicle-inboard end and a height at the vehicle-outboard end different from the height at the vehicle-inboard end.

The open cells may have a volume at the vehicle-inboard end and a volume at the vehicle-outboard end, the volume at the vehicle-outboard end being greater than the volume at the vehicle-inboard end.

The lattice structure at the vehicle-inboard end may be a material type different than the material type of the lattice structure at the vehicle-outboard end.

The material type at the vehicle-outboard end may be weaker than the material type at the vehicle-inboard end.

The energy absorber may abut the headliner and the vehicle roof.

An energy absorber includes an end panel. The assembly includes at least three walls extending in a common direction from the end panel and defining a cavity therebetween. The walls define a base distal to the end panel, the cavity being open at the base. The end panel is designed to match contours of one of a vehicle roof and a vehicle headliner. The base is designed to match contours of the other of the vehicle roof and the vehicle headliner. At least one of the walls has a lattice structure including a repeating pattern of strips and open cells.

The open cells may extend through the walls from the cavity to an exterior of the energy absorber.

The walls may include a first end having a stiffness and a second end having a stiffness different from the stiffness of the first end.

With reference to the Figures, wherein like numerals indicate like parts throughout the several views, an assembly 10 for a vehicle 12 includes a vehicle roof 14 and a headliner 16 supported by the vehicle roof 14. The assembly 10 includes an energy absorber 18 between the headliner 16 and the vehicle roof 14. The energy absorber 18 includes a wall 20 extending transversely to the headliner 16 and the vehicle roof 14. The wall 20 includes a lattice structure 22 including a repeating pattern of strips 24 and open cells 26.

During some crash events to the vehicle 12, e.g. an impact or a roll-over event, an occupant may contact the headliner 16. The energy absorber 18 absorbs energy from the occupant contacting the headliner 16. For example, the energy absorber 18 allows energy to be absorbed from a head impact by the occupant in an outboard direction of the vehicle 12. The lattice structure 22, specifically, the repeating pattern of strips 24 and open cells 26, deforms to absorb energy from the contact of the occupant with the headliner 16. The lattice structure 22 may be designed to deform based on the material of the lattice structure 22, the thickness of the lattice structure 22, the stiffness of the lattice structure 22, etc. The changes in properties of the lattice structure 22 allow for tuning and designing of the energy absorption of the energy absorber 18.

Two example embodiments are shown in the Figures and common numerals are used to identify common features in the example embodiments. One embodiment of the assembly 10 is shown in FIGS. 1-5C and 7. In such an example, the energy absorber 18 defines four cavities 48 in a rectangular pattern with an end panel 44 abutting the headliner 16. A second embodiment of the assembly 10 is shown in FIG. 6. In such an example, the energy absorber 18 defines a single cavity 48 with an end panel 44 abutting the vehicle roof 14.

Figure 2:
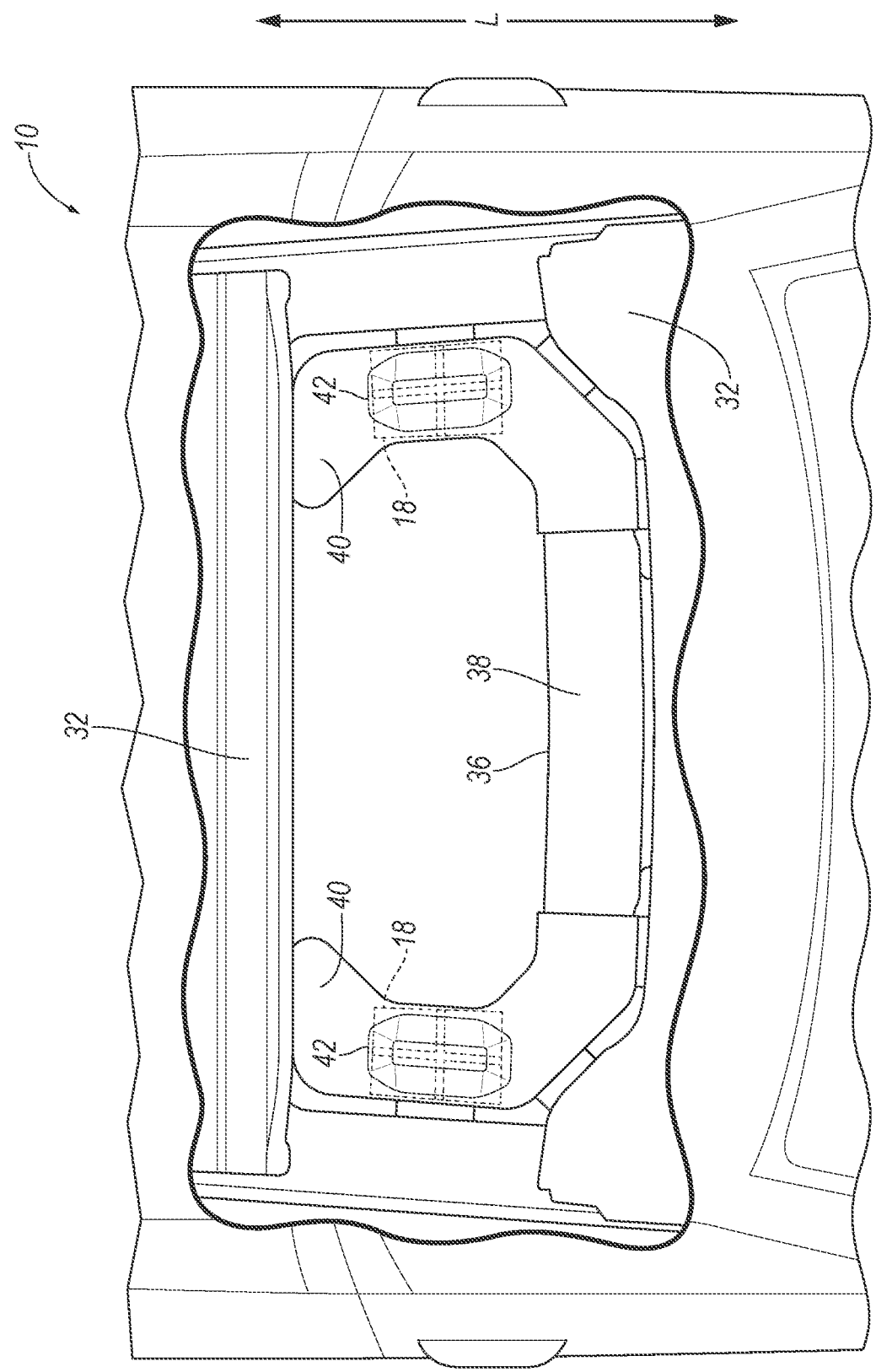
FIG. 2 is a plan, cut-away view of the vehicle roof showing the energy absorbers abutting the vehicle roof.
Figure 3:
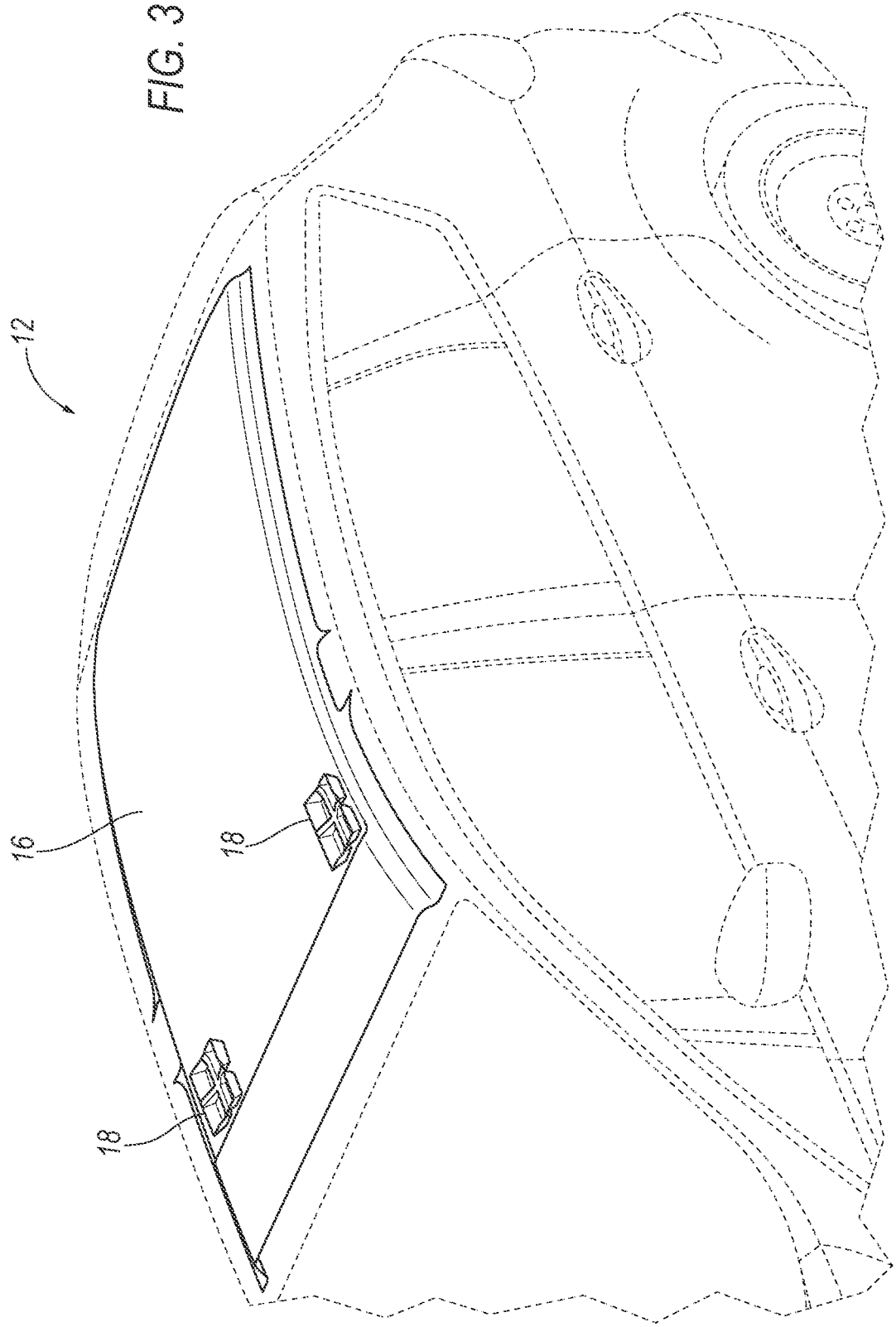
FIG. 3 is a perspective view of the vehicle showing the energy absorbers supported by a headliner of the vehicle.

With reference to FIGS. 1-3, a vehicle 12 may be any suitable type of ground vehicle, e.g., a passenger or commercial automobile such as a sedan, a coupe, a truck, a sport utility, a crossover, a van, a minivan, a taxi, a bus, etc.

The vehicle 12 may include a vehicle body 28. The vehicle body 28 includes body panels (not numbered) partially defining an exterior of the vehicle 12. The body panels may present a class-A surface, e.g., a finished surface exposed to view by a customer and free of unaesthetic blemishes and defects.

The vehicle body 28 defines a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body 28 includes roof rails 30 spaced cross-vehicle from one another. The roof rails 30 each extend along a vehicle-longitudinal axis L.

The vehicle body 28 may include the vehicle roof 14 that may define an upper limit of the passenger compartment of the vehicle 12. The vehicle roof 14 may include beams 32 extending cross-vehicle. The beams 32 may be spaced in a vehicle fore-and-aft direction. The beams 32 may extend from one roof rail 30 to the other roof rail 30. The beams 32 may be irremovably fixed to the roof rails 30 and/or a roof panel 34. In other words, the beams 32 are secured to the roof rails 30 in such a way that removal requires destruction such as cutting, e.g., cutting material and/or welded joints, etc. As an example, the beams 32 may be attached to the roof rails 30, e.g., by welding, fasteners, etc. In addition to the beams 32, the vehicle body 28 may include any suitable beams 32 spaced from one another.

With reference to FIGS. 1-4, the vehicle roof 14 includes the roof panel 34. The roof panel 34 may face toward the exterior of the vehicle 12. The roof panel 34 may extend from one roof rail 30 to the other roof rail 30. The roof panel 34 may be irremovably fixed to the roof rails 30. In other words, the roof panel 34 is secured to the roof rails 30 in such a way that removal requires destruction such as cutting, e.g., cutting material and/or welded joints, etc. As an example, the roof panel 34 may be attached to both roof rails 30, e.g., by welding, fasteners, etc. The roof panel 34 may be irremovably fixed one of the beams 32, e.g., the rearward one of the two beams 32. The roof panel 34 includes a class-A surface facing the exterior of the vehicle 12, i.e., a surface specifically manufactured to have a high quality, finished, aesthetic appearance free of blemishes.

The headliner 16 may be supported by the vehicle body 28, specifically, the vehicle roof 14, underneath the roof panel 34. The headliner 16 may conceal the roof panel 34, i.e., vehicle roof 14, from view inside the vehicle 12, i.e., in the passenger compartment of the vehicle 12. The headliner 16 includes a class-A surface facing the passenger compartment, i.e., a surface specifically manufactured to have a high quality, finished, aesthetic appearance free of blemishes. The headliner 16 may be, for example, a polymeric panel that spans the vehicle roof 14. As an example, the headliner 16 may include polyurethane foam. The headliner 16 may be designed to absorb energy, e.g., by compression and deformation, in the event the headliner 16 is impacted by an occupant.

With reference to FIGS. 1-2, the vehicle roof 14 may include a roof member 36 between two of the beams 32. The roof member 36 may be spaced from the beams 32 along the vehicle-longitudinal axis L. The roof member 36 may be between the roof rails 30 of the vehicle body 28, e.g., spaced cross-vehicle from the roof rails 30. The roof member 36 may be between the headliner 16 and the roof panel 34.

The roof member 36 includes a cross-vehicle portion 38 extending cross-vehicle and a pair of extensions 40 that extend vehicle-rearward from the cross-vehicle portion 38. The pair of extensions 40 are spaced cross-vehicle from each other along the cross-vehicle portion 38. The pair of extensions 40 each include a concave portion 42. The concave portions 42 extend downwardly from the extensions 40 toward the headliner 16. The concave portions 42 may be stamped into the roof member 36.

With reference to the Figures, the vehicle 12 includes the energy absorber 18. During some crash events, e.g., an impact or a roll-over event, an occupant may contact the headliner 16. The energy absorber 18 absorbs energy from the occupant contacting the headliner 16. The energy absorber 18 may deform in the event of an occupant contacting the headliner 16 during a crash event of the vehicle 12.

Figure 4:
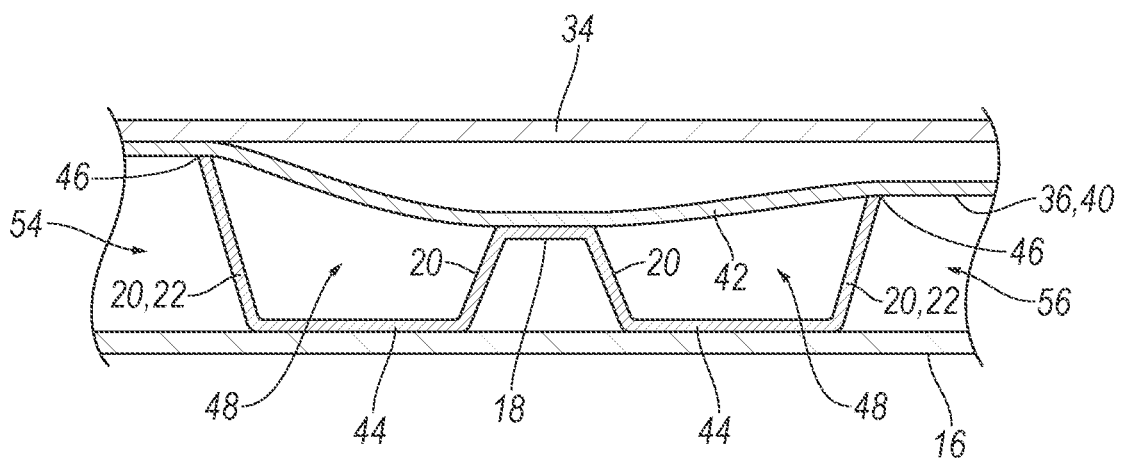
FIG. 4 is a cross-sectional view of the energy absorber between the headliner and the vehicle roof through line 4 of FIG. 1.

With reference to FIG. 4, the energy absorber 18 is between the vehicle roof 14 and the headliner 16. Specifically, the energy absorber 18 is between the roof member 36 and the headliner 16. The energy absorbers 18 are localized. In other words, the dimensions of the energy absorber 18 in a cross-vehicle direction and a vehicle-fore-and-aft direction may be smaller than the vehicle roof 14 and the headliner 16. Specifically, the dimensions of the energy absorber 18 may be a small fraction of the dimensions of the vehicle roof 14 and the headliner 16. The vehicle 12 may include an energy absorber 18 at each of the concave portions 42. As in the example in FIGS. 1-3, the vehicle 12 include two energy absorbers 18, one on each side of the vehicle 12 at the concave portions 42. In such an example, the energy absorbers 18 may be positioned between the vehicle roof 14 and the headliner 16 above occupants of the vehicle 12, specifically a driver and a passenger seated in a first row of the vehicle 12. The vehicle 12 may include any suitable number of energy absorbers 18 between the vehicle roof 14 and the headliner 16.

The energy absorber 18 may abut the headliner 16 and the vehicle roof 14. Specifically, the energy absorber 18 may abut the headliner 16 and the roof member 36 at the concave portion 42. The energy absorber 18 may be adhered to one of the headliner 16 and the vehicle roof 14. In an example where the energy absorber 18 is adhered to the headliner 16, the energy absorber 18 may be installed into the vehicle 12 when the headliner 16 is installed into the vehicle 12. In an example where the energy absorber 18 is adhered to the vehicle roof 14, the energy absorber 18 may be installed prior to the headliner 16 being installed into the vehicle 12.

With reference to FIGS. 4-7, the energy absorber 18 includes the wall 20 extending transversely to the headliner 16 and the vehicle roof 14. Specifically, the wall 20 extends between the headliner 16 and the vehicle roof 14. The energy absorber 18 may include additional walls 20 extending transversely to each other and transversely to the headliner 16. Specifically, the energy absorber 18 includes at least three walls 20 extending in a common direction between the headliner 16 and the vehicle roof 14. In the examples shown in the Figures, the walls 20 extend between the headliner 16 and the roof member 36.

The energy absorber 18 includes an end panel 44 and a base 46 distal to the end panel 44. The end panel 44 connects the walls 20. The walls 20 extend in a common direction from the end panel 44 to the base 46.

The end panel 44 and base 46 may be adjacent the vehicle roof 14 and the headliner 16. Specifically, the end panel 44 may be adjacent one of the vehicle roof 14 and the headliner 16 and the base 46 may be adjacent the other of the vehicle roof 14 and the headliner 16. The end panel 44 may abut one of the vehicle roof 14 and the headliner 16. In the example shown in FIGS. 1-5C and 7, the base 46 abuts the vehicle roof 14 and the end panel 44 abuts the headliner 16. In the example shown in FIGS. 6, the base 46 abuts the headliner 16 and the end panel 44 abuts the vehicle roof 14.

As discussed above, the energy absorber 18 may be adhered to one of the headliner 16 and the vehicle roof 14. Specifically, the base 46 may be adhered to one of the vehicle roof 14 and the headliner 16. As one example, as shown in FIG. 6, the base 46 may be adhered to the headliner 16 when the end panel 44 abuts the vehicle roof 14. As another example, as shown in FIGS. 1-5C and 7, the base 46 is adhered to the vehicle roof 14 when the end panel 44 abuts the headliner 16.

With continued reference to FIGS. 4-7, the base 46 and the end panel 44 may each be shaped to match the contours of the vehicle roof 14 and the headliner 16. Specifically, the base 46 or end panel 44 is shaped to match the contours of the component to which it is adjacent. In other words, the end panel 44 is shaped to match contours of the vehicle roof 14 and the headliner 16 and the base 46 is shaped to match contours of the other of the vehicle roof 14 and the headliner 16.

The walls 20 define a cavity 48 therebetween. The end panel 44 of the energy absorber 18 extends across the cavity 48. The cavity 48 is open at the base 46. In other words, the cavity 48 may extend from the end panel 44 of the energy absorber 18 to the base 46 where the cavity 48 is open. The energy absorber 18 may include any suitable number of cavities 48. In the example shown in FIGS. 1-5C and 7, the energy absorber 18 may include four cavities 48 in a rectangular pattern. The cavities 48 may be connected to each other by an additional panel extending along the vehicle roof 14. In such an example, the cavities 48 may be open upwardly, e.g., adjacent the vehicle roof 14. In the example shown in FIGS. 6, the energy absorber 18 may include a single cavity 48. In such an example, the cavity 48 may be open downwardly, e.g., the base 46 may be adjacent the headliner 16.

Figure 5:
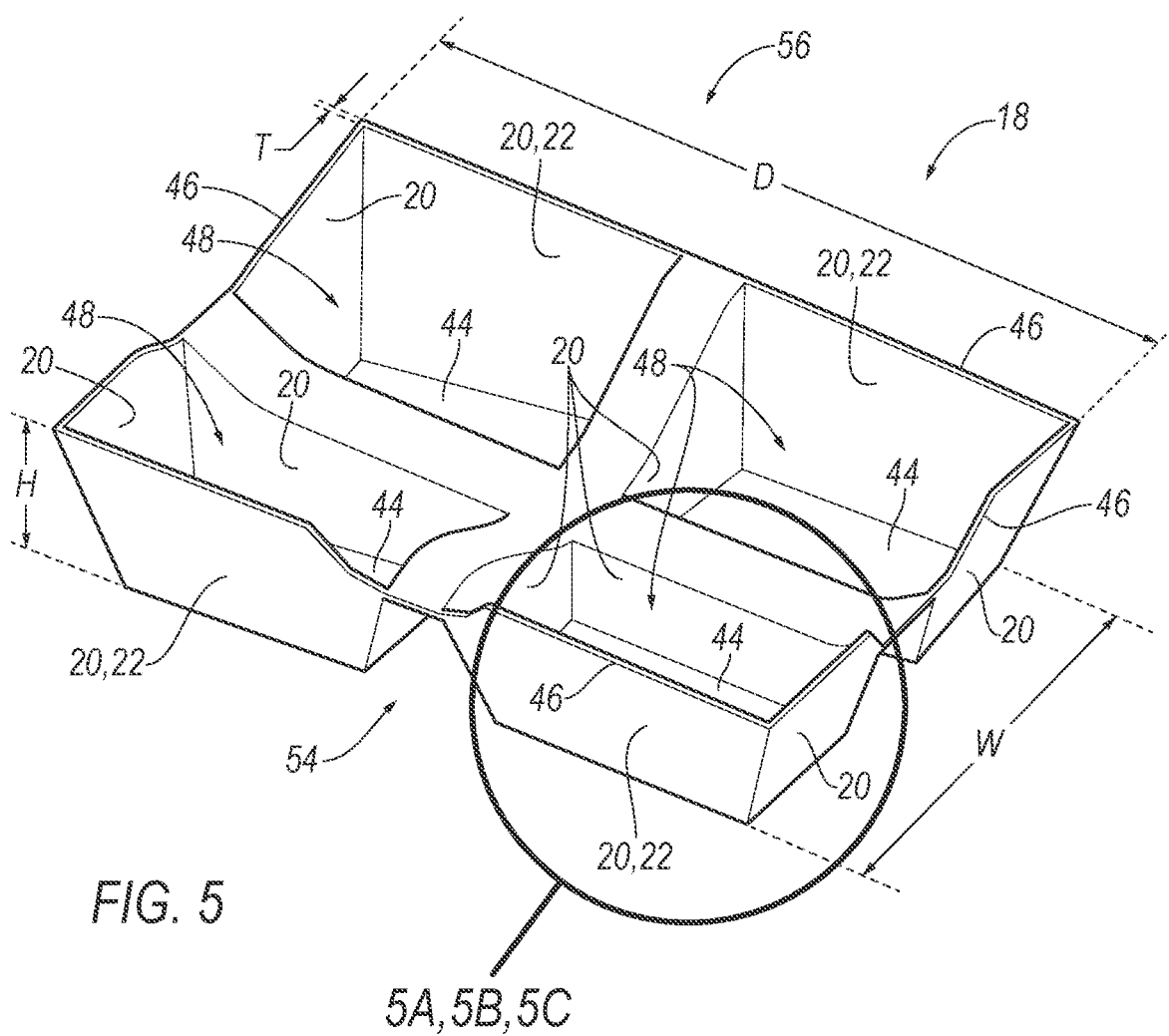
FIG. 5 is a perspective view of a first example of the energy absorber.
Figure 5A:
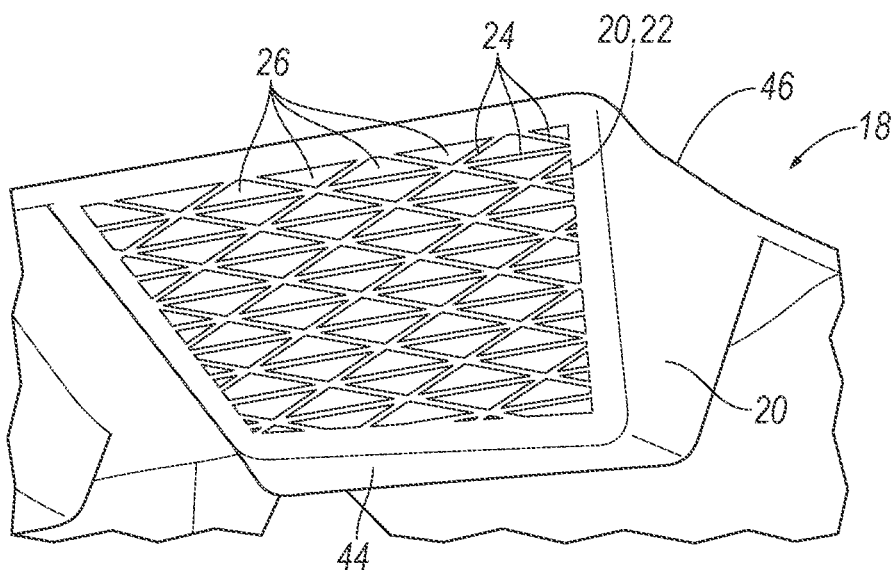
FIG. 5A is a view of a first example of a lattice structure of the energy absorber.
Figure 6:
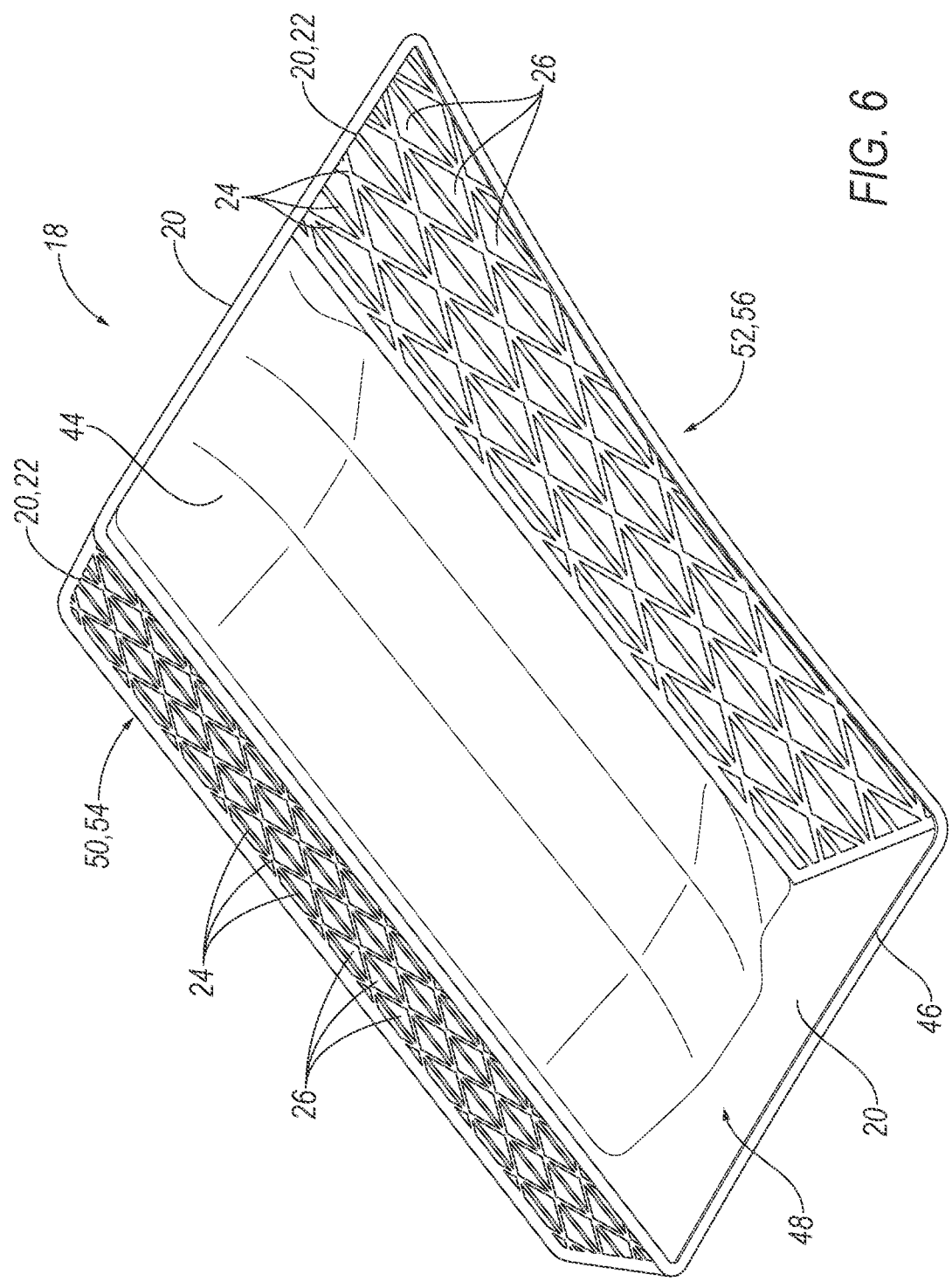
FIG. 6 is a perspective view of a second example of the energy absorber.

With reference to FIGS. 5A-6, the wall 20 includes the lattice structure 22. At least one of the additional walls 20 of the energy absorber 18 includes a lattice structure 22. Any suitable number of walls 20 of the energy absorber 18 may include a lattice structure 22. The lattice structure 22 may include multiple interconnected cells. For example, the lattice structure 22 of the wall 20 may include a repeating pattern of strips 24 and open cells 26. The open cells 26 may extend through the wall 20 of the energy absorber 18 from the cavity 48 to an exterior of the energy absorber 18. The lattice structure 22 may be monolithic, i.e., the strips 24 (and the rest of the wall 20 in examples in which the wall 20 includes more than the strips 24) are a single, uniform piece of material with no seams, joints, fasteners, or adhesives holding them together. Specifically, the strips 24 and the rest of the wall 20 are formed together simultaneously as a single continuous unit, e.g., by additive manufacturing (also referred to as 3-D printing), machining from a unitary blank, molding, forging, casting, etc. Non-unitary components, in contrast, are formed separately and subsequently assembled, e.g., by threaded engagement, welding, etc.

Figure 5B:
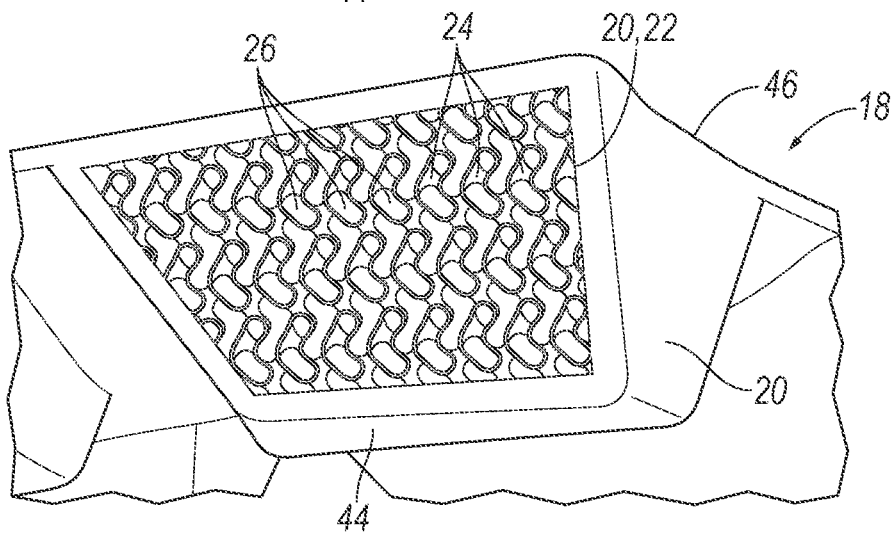
FIG. 5B is a view of a second example of the lattice structure of the energy absorber.
Figure 5C:
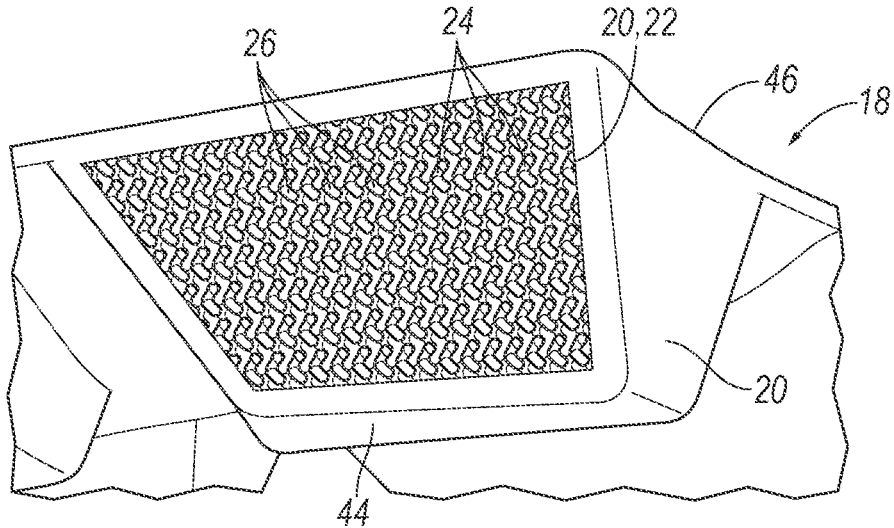
FIG. 5C is a view of a third example of the lattice structure of the energy absorber.

FIG. 5A shows a first example of the lattice structure 22 of the wall 20 of the energy absorber 18. The lattice structure 22 of this example includes the strips 24 and open cells 26. FIG. 5B shows a second example of the lattice structure 22 of the wall 20 of the energy absorber 18. The lattice structure 22 includes a single repeating segment of strips 24 and open cells 26. FIG. 5C shows a third example of the lattice structure 22 of the wall 20 of the energy absorber 18. The lattice structure 22 includes a pair of repeating segments of strips 24 and open cells 26.

Various production techniques may be used to produce the lattice structure 22 of the energy absorber 18. For example, the lattice structure 22 may be 3D printed. For example, the lattice structure 22 can be 3D printed using Selective Laser Melting (SLM) techniques. SLM is a particular rapid prototyping technique, e.g., 3D printing, Additive Manufacturing (AM), etc., designed to use a high power-density laser to melt and fuse metallic powders together. Other 3D printing processes, techniques and materials may be used.

The lattice structure 22 is plastically deformable relative to the headliner 16 and the vehicle roof 14. In other words, application of a force to the wall 20 of the energy absorber 18, such as that applied to the vehicle roof 14 during some crash events to the vehicle 12, causes the walls 20, specifically, the strips 24, to plastically deform. During this plastic deformation, a length of the strips 24 increases to relieve force applied to the headliner 16 caused by inertia of the occupant contacting the headliner 16 during the crash event to the vehicle 12.

Plastic deformation, in the context of present disclosure, is a deformation of a solid material undergoing irreversible changes of its shape in response to applied forces. For example, the strips 24 of the lattice structure 22 may plastically deform when the force exceeds a threshold. When the force exceeds the threshold, the lattice structure 22 plastically deform. The threshold at which the force plastically deforms the lattice structure 22 of the walls 20 may be defined based on the size, shape, material, etc., of the strips 24 and open cells 26 as described below. For example, the threshold at which the force plastically deforms the lattice structure 22 of the walls 20 may be defined based on the dimensions of open cells 26 of the lattice structure 22, the shape of the open cells 26 of the lattice structure 22, the volume fraction of the lattice structure 22, etc. The characteristics of the walls 20 and the characteristics of the lattice structure 22 of the walls 20 may be selected based on the threshold at which the force plastically deforms the lattice structure 22, an estimated weight of the occupant, estimated deceleration forces of the vehicle 12 during a crash event or impact, etc.

With reference to FIGS. 5A-6, the lattice structure 22 may include a first portion 50 and a second portion 52. In some examples, as shown in the FIG. 6, the first portion 50 and the second portion 52 may be spaced from each other. Specifically, the first portion 50 may be along the lattice structure 22 of one wall 20 of the energy absorber 18 and the second portion 52 may be along the lattice structure 22 of another wall 20 of the energy absorber 18. In other examples, the first portion 50 and the second portion 52 may be adjacent each other. Specifically, the first portion 50 and the second portion 52 may be a part of the same wall 20 of the energy absorber 18.

In some examples, the lattice structure 22 at the vehicle-inboard end 54, i.e., the first portion 50, may be a material type different than the material type of the lattice structure 22 at the vehicle-outboard end 56, i.e., the second portion 52. Specifically, the strips 24 of the first portion 50 may be a material type different than the material type of the strips 24 of the second portion 52. In other examples, the energy absorber 18 may be a single material type. Specifically, the energy absorber 18 may be a polymer. Specifically, the energy absorber 18 polypropylene. The energy absorber 18 may be of any suitable material type to allow the lattice structure 22 of the energy absorber 18 to deform and absorb energy. The material type at the vehicle-outboard end 56 may be weaker than the material type at the vehicle-inboard end 54.

The energy absorber 18 may have a stiffness along the wall 20 or walls 20 to allow the energy absorber 18 to deform and absorb energy. Specifically, the wall 20 of the energy absorber 18 may have a stiffness at the vehicle-inboard end 54, i.e., the first portion 50, and a stiffness at the vehicle-outboard end 56, i.e., the second portion 52. The stiffness at the vehicle-inboard end 54 may be greater than the stiffness at the vehicle-outboard end 56. In other words, the vehicle-outboard end 56 deforms more easily than the vehicle-inboard end 54.

As shown in the example of FIG. 6, the open cells 26 may have a volume at the vehicle-inboard end 54, i.e., the first portion 50, and a volume at the vehicle-outboard end 56, i.e., the second portion 52, that is different from the volume at the vehicle-inboard end 54. Specifically, the volume at the vehicle-outboard end 56 may be greater than the volume at the vehicle-inboard end 54 to allow the stiffness at the vehicle-inboard end 54 to be greater than the stiffness at the vehicle-outboard end 56. In other words, the vehicle-inboard end 54 may be stiffer than the vehicle-outboard end 56.

As shown in the example of FIG. 5, the energy absorber 18 may define a height H, a length D, a width W, and a thickness T. The height is the dimension of the energy absorber 18 that extends from the headliner 16 to the roof. The strips 24 may have a height H at the vehicle-inboard end 54 and a height H at the vehicle-outboard end 56. Specifically, the height H at the vehicle-inboard end 54 is different from the height H at the vehicle-outboard end 56. The height H at the vehicle-inboard end 54 may be greater than or less than the height H at the vehicle-outboard end 56 to match the contours of the vehicle roof 14. The varying height H varies the stiffness of the strips 24. The height H may vary at any suitable position of the energy absorber 18.

The length D of the energy absorber 18 is the dimension of the energy absorber 18 extending along the vehicle-longitudinal axis L in the vehicle 12. The width W of the energy absorber 18 extends along the cross-vehicle direction. The thickness T of the energy absorber 18 may be referred to as the wall thickness T. The thickness T, i.e., the wall thickness T, may vary at different positions of the energy absorber 18 or walls 20 to vary the stiffness of the energy absorber 18. In other words, the varying dimensions allow the energy absorber 18 to deform differently along the energy absorber 18 because the stiffness varies.

The difference in the stiffness, e.g., the open cell 26 volumes and the strip 24 height H, between the vehicle-inboard end 54 and the vehicle-outboard end 56 allows differing deformation of the energy absorber 18 at different locations along the energy absorber 18. The differing deformation allows for differing energy absorption along the energy absorber 18.

Figure 7:
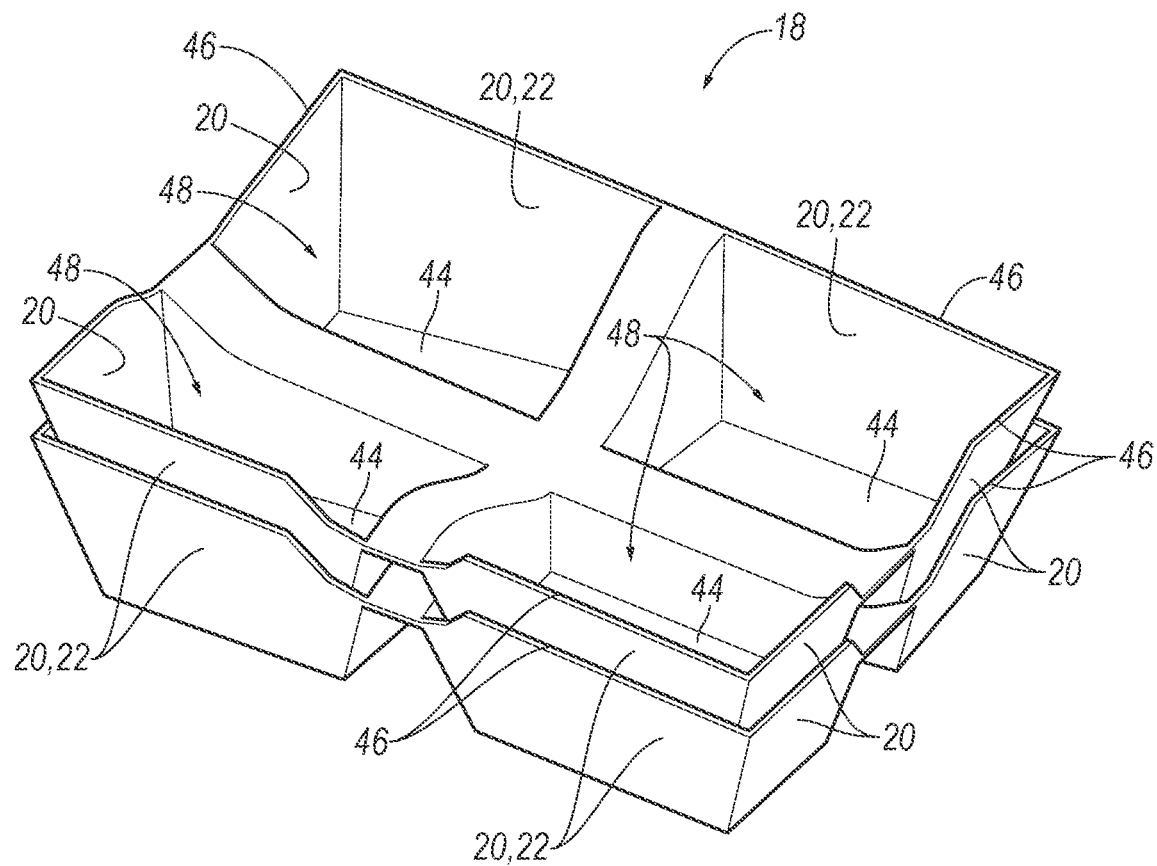
FIG. 7 is a perspective view of the first example of the energy absorber nested with a second energy absorber.

As shown in FIG. 7, the energy absorber 18 may be nestable. Specifically, when the energy absorber 18 is not installed in the vehicle 12, the energy absorber 18 may be nestable with another energy absorber 18. When nested, the cavity 48 of the energy absorber 18 may receive the cavity 48 of another energy absorber 18. The walls 20 of each of the energy absorbers 18 may be adjacent each other and the end panels 44 of the energy absorber 18 may be adjacent and, in some examples, abutting the end panel 44 of the other of the energy absorbers 18. Nesting of the energy absorber 18 allows for efficiency in packaging of the energy absorbers 18 for shipping and storage. In examples where the energy absorbers 18 are manufactured using 3D printing, the nesting provides a cost advantage by allowing multiple energy absorbers 18 to be printed at once. Any suitable number of energy absorbers 18 may be nested together for shipping and storage.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a vehicle roof;
a headliner supported by the vehicle roof;
an energy absorber between the headliner and the vehicle roof, the energy absorber having a wall extending transversely to the headliner and the vehicle roof;
the wall having a lattice structure including a repeating pattern of strips and open cells;
the energy absorber including additional walls extending transversely to each other and transversely to the headliner and the walls defining a cavity therebetween;
the open cells extending through the wall from the cavity to an exterior of the energy absorber;
the energy absorber including an end panel connected to the walls and extending across the cavity and a base distal to the end panel, the cavity being open at the base, the end panel abutting one of the vehicle roof and the headliner and the base being adhered to the other of the vehicle roof and the headliner; and
the lattice structure including a vehicle-inboard end and a vehicle-outboard end, the open cells having a volume at the vehicle-inboard end and a volume at the vehicle-outboard end different from the volume at the vehicle-inboard end.

2. The assembly of claim 1, wherein the energy absorber is polypropylene.

3. The assembly of claim 1, wherein at least one of the additional walls includes the lattice structure.

4. The assembly of claim 1, wherein the base is shaped to match contours of the other of the vehicle roof and the headliner.

5. The assembly of claim 1, wherein the end panel is shaped to match contours of the one of the vehicle roof and the headliner.

6. The assembly of claim 1, wherein the lattice structure includes a first portion and a second portion, the strips having a height at the first portion and a height at the second portion different from the height at the first portion.

7. The assembly of claim 1, wherein the wall includes a vehicle-inboard end having a stiffness and a vehicle-outboard end having a stiffness, the stiffness at the vehicle-inboard end of the wall being greater than the stiffness at the vehicle-outboard end of the wall.

8. The assembly of claim 7, wherein the strips have a height at the vehicle-inboard end of the wall and a height at the vehicle-outboard end of the wall different from the height at the vehicle-inboard end of the wall.

9. The assembly of claim 7, wherein the open cells have a volume at the vehicle-inboard end of the wall and a volume at the vehicle-outboard end of the wall, the volume at the vehicle-outboard end of the wall being greater than the volume at the vehicle-inboard end of the wall.

10. An energy absorber comprising:
an end panel; and
at least three walls extending in a common direction from the end panel and defining a cavity therebetween;
the walls defining a base distal to the end panel, the cavity being open at the base;
the end panel designed to match contours of one of a vehicle roof and a vehicle headliner;
the base designed to match contours of the other of the vehicle roof and the vehicle headliner;
at least one of the walls extending transversely to the headliner and the vehicle roof and at least one of the walls having a lattice structure including a repeating pattern of strips and open cells;
the open cells extend through the walls from the cavity to an exterior of the energy absorber;
the end panel abutting one of the vehicle roof and the headliner and the base being adhered to the other of the vehicle roof and the headliner; and
the lattice structure including a vehicle-inboard end and a vehicle-outboard end, the open cells having a volume at the vehicle-inboard end and a volume at the vehicle-outboard end different from the volume at the vehicle-inboard end.

11. The energy absorber of claim 10, wherein the walls include a first end having a stiffness and a second end having a stiffness different from the stiffness of the first end.

\* \* \* \* \*